(12) United States Patent
Choy et al.

(10) Patent No.: US 12,050,049 B2
(45) Date of Patent: *Jul. 30, 2024

(54) WATER PREFILLING ASSEMBLY FOR USE IN A REFRIGERATING APPLIANCE

(71) Applicant: WHIRLPOOL CORPORATION, Benton Harbor, MI (US)

(72) Inventors: Kaito Choy, Chicago, IL (US); Ravi Joshi, St. Joseph, MI (US); Vikas C. Mruthyunjaya, St. Joseph, MI (US); Henrique Keiji Arai Yamaki, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,725

(22) Filed: Apr. 14, 2023

(65) Prior Publication Data

US 2023/0251029 A1    Aug. 10, 2023

Related U.S. Application Data

(63) Continuation of application No. 17/070,106, filed on Oct. 14, 2020, now Pat. No. 11,668,516, which is a continuation of application No. 16/236,392, filed on Dec. 29, 2018, now Pat. No. 10,837,698.

(51) Int. Cl.
*F25D 23/12* (2006.01)
*B67D 3/00* (2006.01)
*F25D 25/02* (2006.01)
*G01F 13/00* (2006.01)
*G01F 15/00* (2006.01)

(52) U.S. Cl.
CPC .......... *F25D 23/126* (2013.01); *B67D 3/0003* (2013.01); *B67D 3/0025* (2013.01); *B67D 3/0093* (2013.01); *F25D 25/02* (2013.01); *G01F 13/00* (2013.01); *G01F 15/003* (2013.01); *F25D 2400/06* (2013.01); *F25D 2400/361* (2013.01)

(58) Field of Classification Search
CPC .. B67D 3/0003; B67D 3/0025; B67D 3/0093; B67D 3/009; F25D 23/126
See application file for complete search history.

(56) References Cited

U.S. PATENT DOCUMENTS

| | | |
|---|---|---|
| 3,024,621 A | 3/1962 | Parker |
| 3,250,303 A | 5/1966 | Sollmann |
| 5,309,960 A | 5/1994 | Boyd |

(Continued)

FOREIGN PATENT DOCUMENTS

| | | |
|---|---|---|
| CN | 1922097 A | 2/2007 |
| CN | 101535750 A | 9/2009 |

(Continued)

*Primary Examiner* — Schyler S Sanks
(74) *Attorney, Agent, or Firm* — Price Heneveld LLP (57) ABSTRACT

A fluid delivery system for an appliance includes a fluid line in selective communication with a fluid source. A shelf defines a fill zone positioned below an underside of the shelf. A shelf spigot is coupled with the fluid line and disposed proximate the underside of the shelf and over the fill zone. A fluid level sensor is positioned in communication with the fill zone. The fluid level sensor is also in communication with a controller that regulates a flow of fluid through the shelf spigot.

20 Claims, 11 Drawing Sheets

(56) References Cited

U.S. PATENT DOCUMENTS

| | | |
|---|---|---|
| 6,574,984 B1 | 6/2003 | Mccrea et al. |
| 7,658,212 B2 | 2/2010 | Meuleners et al. |
| 8,377,292 B2 | 2/2013 | Patera et al. |
| 8,656,731 B2 | 2/2014 | Kim |
| 9,010,144 B2 | 4/2015 | Park et al. |
| 9,890,029 B2 | 2/2018 | Comsa et al. |
| 9,915,468 B2 | 3/2018 | You et al. |
| 10,294,091 B2 | 5/2019 | Eaton et al. |
| 10,611,621 B2 | 4/2020 | Gonzales |
| 10,837,698 B2 | 11/2020 | Choy et al. |
| 2005/0178273 A1 | 8/2005 | Meuleners et al. |
| 2007/0278141 A1 | 12/2007 | Patera et al. |
| 2012/0024003 A1 | 2/2012 | Kim |
| 2014/0283542 A1 | 9/2014 | Jang |
| 2015/0197417 A1 | 7/2015 | Stagg et al. |
| 2016/0052767 A1 | 2/2016 | Eaton et al. |
| 2017/0241701 A1* | 8/2017 | Lee .................... B01F 23/2132 |
| 2017/0341920 A1 | 11/2017 | Gonzales |
| 2019/0033790 A1 | 1/2019 | Peter et al. |
| 2021/0025648 A1 | 1/2021 | Choy et al. |

FOREIGN PATENT DOCUMENTS

| | | |
|---|---|---|
| EP | 1752723 A2 | 2/2007 |
| WO | 200306451 A1 | 6/2003 |

\* cited by examiner

WATER PREFILLING ASSEMBLY FOR USE IN A REFRIGERATING APPLIANCE

CROSS-REFERENCE TO RELATED APPLICATION

The present application is a continuation of U.S. patent application Ser. No. 17/070,106 filed Oct. 14, 2020, now U.S. Pat. No. 11,668,516, which is a continuation of U.S. patent application Ser. No. 16/236,392 filed Dec. 29, 2018, now U.S. Pat. No. 10,837,698, both of which are entitled WATER PREFILLING ASSEMBLY FOR USE IN A REFRIGERATING APPLIANCE, the entire disclosures of which is hereby incorporated herein by reference.

FIELD OF THE DEVICE

The device is in the field of refrigerating appliances, and more specifically, a water delivery system for providing prefilled containers of water that can be removed and dispensed by the user.

SUMMARY

In at least one aspect, a refrigerating appliance includes a structural cabinet having an inner liner and an outer wrapper that define an insulating cavity. The inner liner defines a refrigerating compartment. A water dispensing system has at least one fluid outlet. A shelf is positioned within the refrigerating compartment. The shelf includes a shelf spigot of the water dispensing system. The shelf spigot is positioned below an underside of the shelf. A fluid level sensor monitors a fluid level of a fluid container that is selectively positioned within a fill zone located below the shelf spigot. The fluid level sensor is in communication with the water dispensing system.

In at least another aspect, a refrigerating appliance includes a structural cabinet having an inner liner that defines a refrigerating compartment. A water dispensing system is coupled to the structural cabinet and having at least one fluid outlet. A shelf is coupled with the inner liner and positioned within the refrigerating compartment. The shelf includes a plurality of shelf spigots of the at least one fluid outlet. The plurality of shelf spigots are positioned below an underside of the shelf. A plurality of removable fluid containers are in communication with the plurality of shelf spigots. The plurality of shelf spigots are positioned below the underside of the shelf. Fluid level sensors are in communication with respective fluid containers of the plurality of removable fluid containers. The fluid level sensors are in communication with the water dispensing system.

In at least another aspect, a fluid delivery system for an appliance includes a fluid line in selective communication with a fluid source. A shelf defines a fill zone positioned below an underside of the shelf. A shelf spigot is coupled with the fluid line and disposed proximate the underside of the shelf and over the fill zone. A fluid level sensor is positioned in communication with the fill zone. The fluid level sensor is also in communication with a controller that regulates a flow of fluid through the shelf spigot.

These and other features, advantages, and objects of the present device will be further understood and appreciated by those skilled in the art upon studying the following specification, claims, and appended drawings.

DETAILED DESCRIPTION OF EMBODIMENTS

Figure 1:
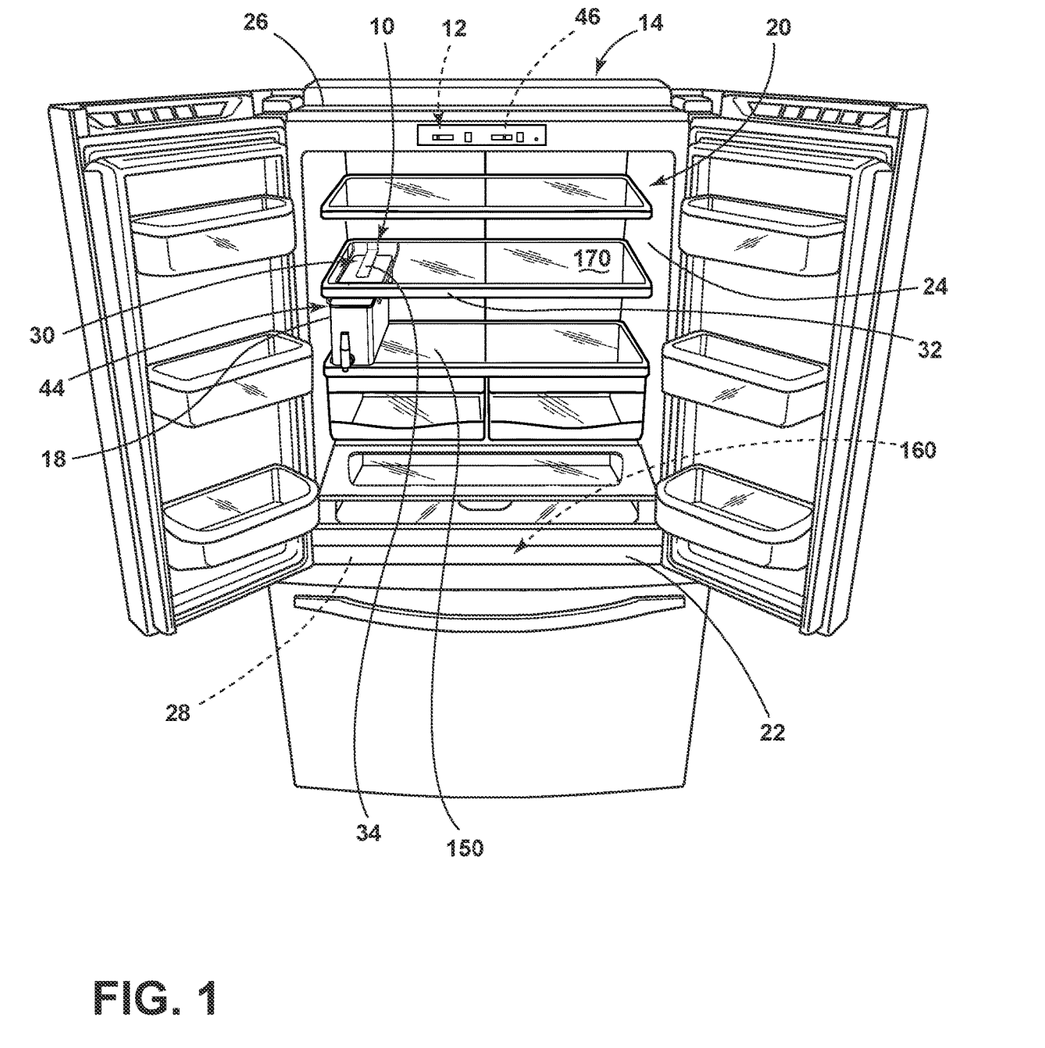
FIG. 1 is a front perspective view of a refrigerating appliance with the doors in an open position and showing an aspect of the prefilling water dispenser.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-6, reference numeral 10 generally refers to a prefilling water dispenser that is incorporated within a water dispensing system 12 for an appliance 14. The prefilling water dispenser 10 is configured to provide water 16 into removable fluid containers 18 that can be cooled within a refrigerating compartment 20 and then removed for use as needed by the user. According to various aspects of the device, a refrigerating appliance 14 includes a structural cabinet 22 having an inner liner 24 and an outer wrapper 26 that define an insulating cavity 28. The inner liner 24 also defines the refrigerating compartment 20 within the structural cabinet 22. A water dispensing system 12 is included within the structural cabinet 22 and includes at least one fluid outlet 30. A shelf 32 is positioned within a refrigerating compartment 20. The shelf 32 includes a shelf spigot 34 of the water dispensing system 12. The shelf spigot 34 is typically positioned below, and attached to, an underside 36 of the shelf 32. A fluid level sensor 38 is included proximate the shelf spigot 34. The fluid level sensor 38 monitors a fluid level 40 of a dispensed fluid 42 within a removable fluid container 18 that is selectively positioned within a fill zone 44 located below the shelf spigot 34. The fluid level sensor 38 is in communication with the water dispensing system 12. When the fluid level sensor 38 monitors that the dispensed fluid 42 is approaching or is at a predetermined fill level within the fluid dispenser, the fluid level sensor 38 can communicate with a controller 46 to stop a flow of dispensed fluid 42 from the shelf spigot 34.

Figure 2:
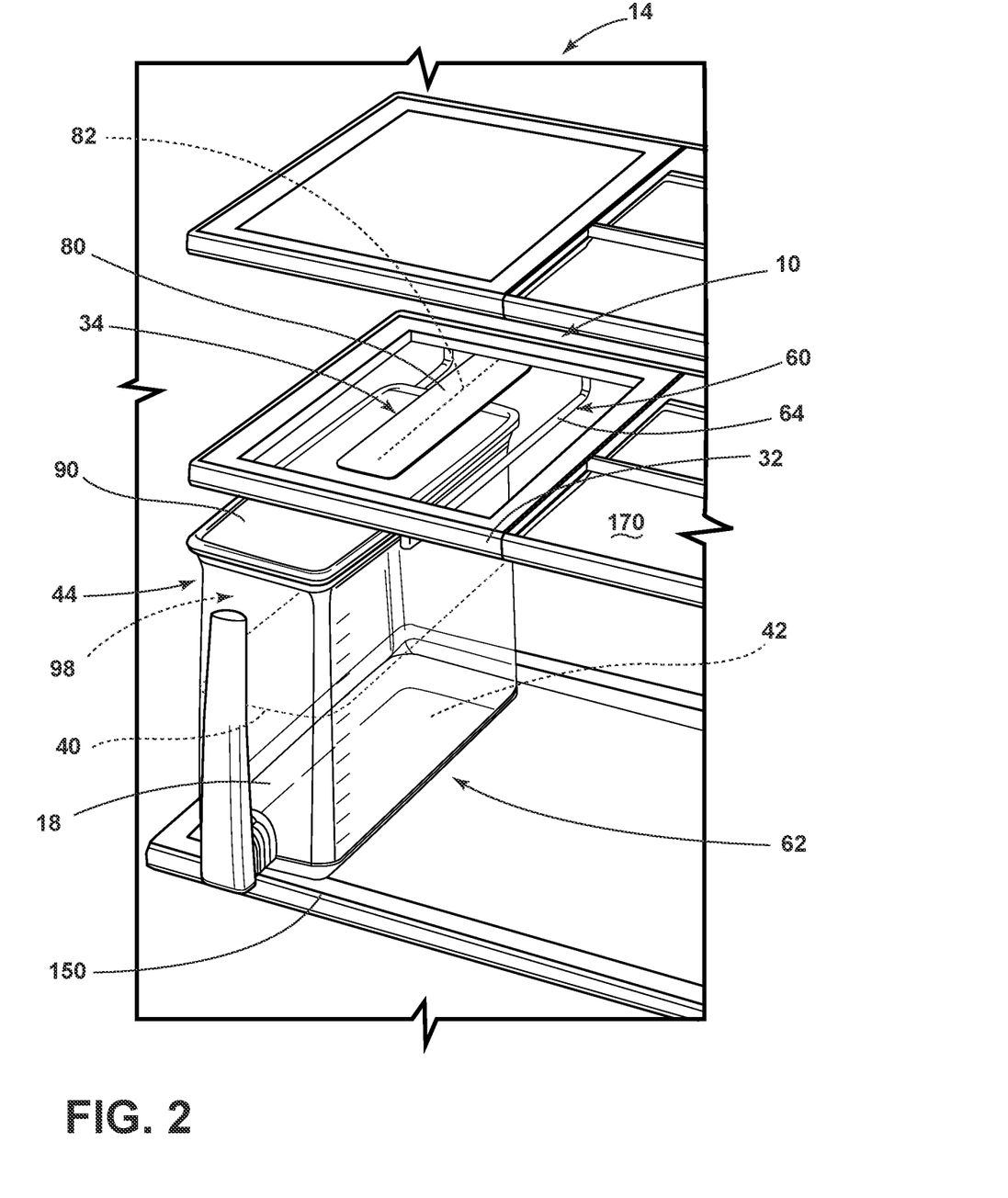
FIG. 2 is an enlarged perspective view of an aspect of the prefilling water dispenser and showing a fluid container within a accessible zone of the appliance.
Figure 3:
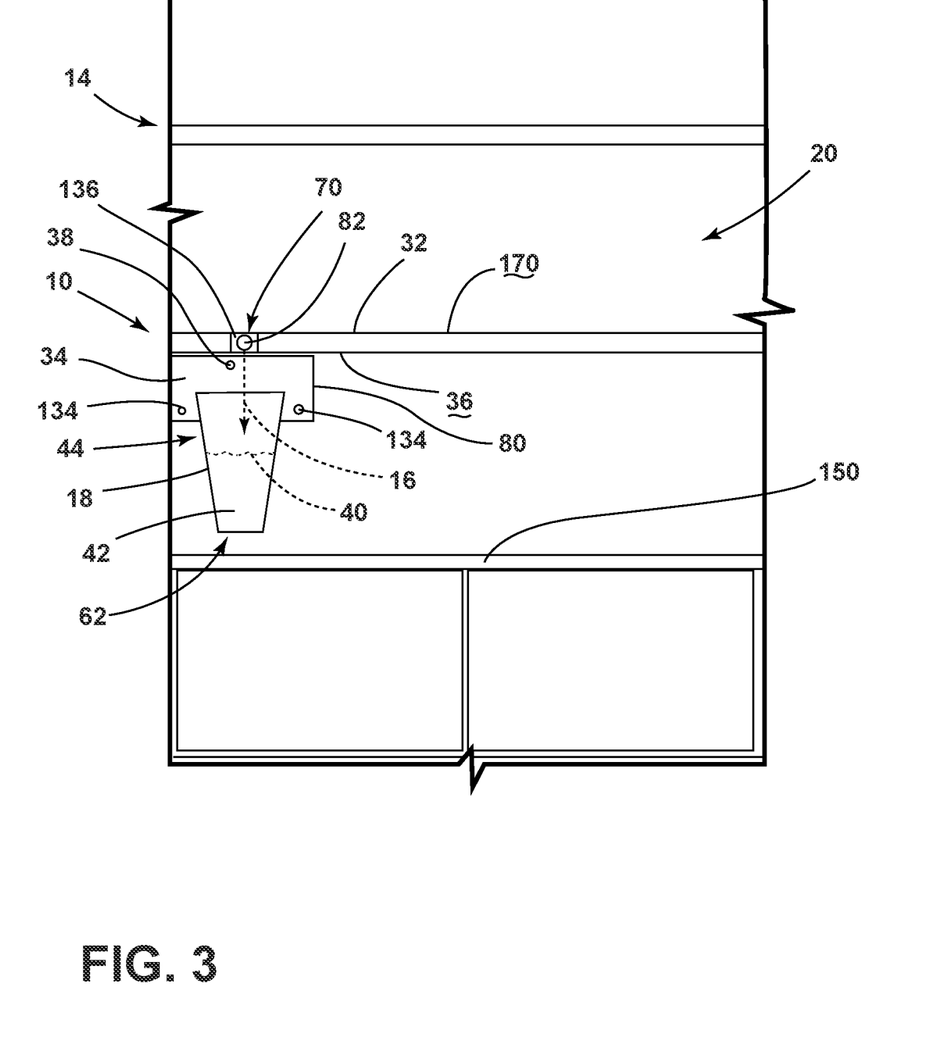
FIG. 3 is a schematic cross-sectional view of an aspect of the prefilling water dispenser.
Figure 4:
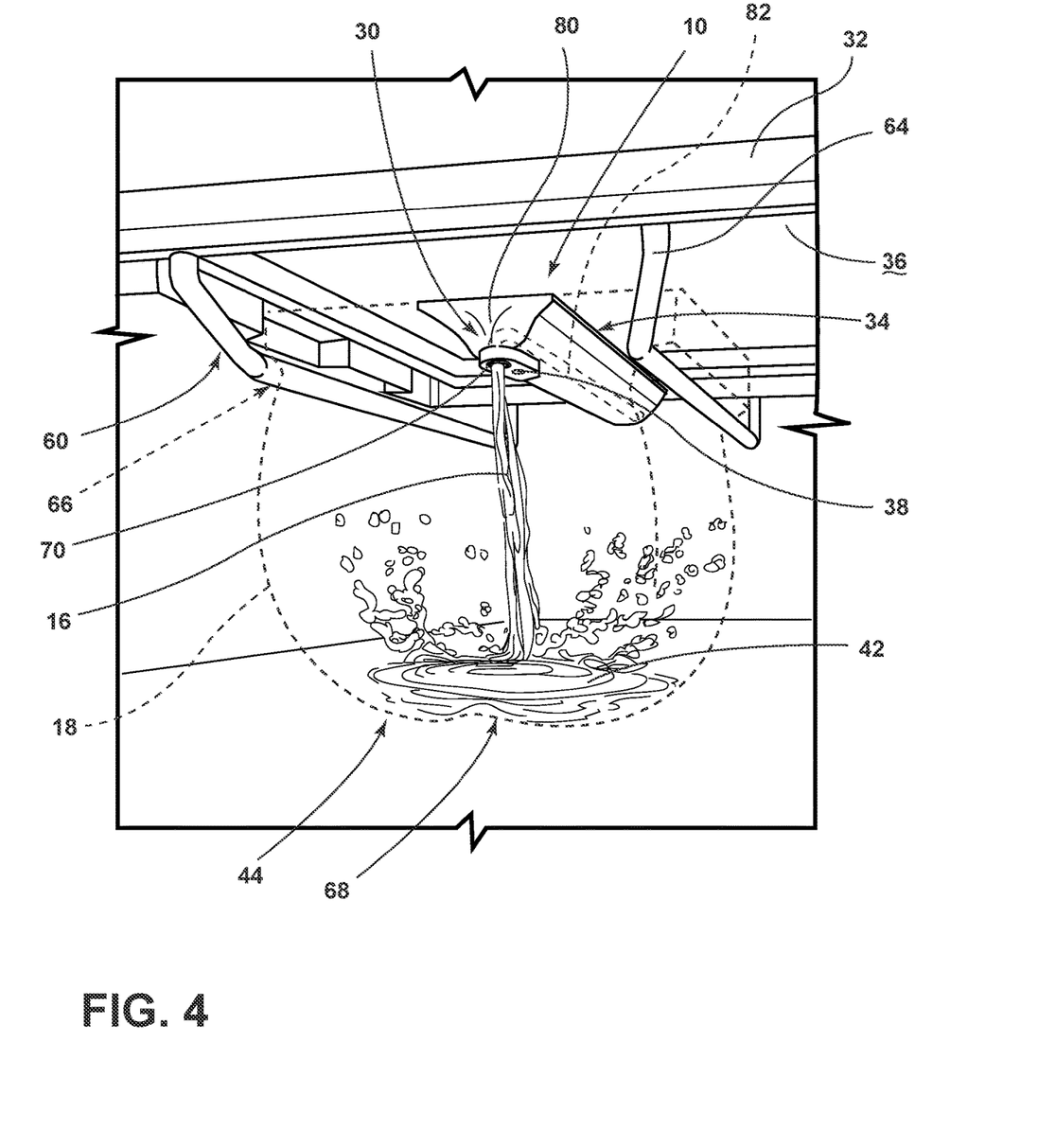
FIG. 4 is a cross-sectional view of an aspect of the prefilling water dispenser and showing dispensing of water into a removable fluid container.
Figure 5:
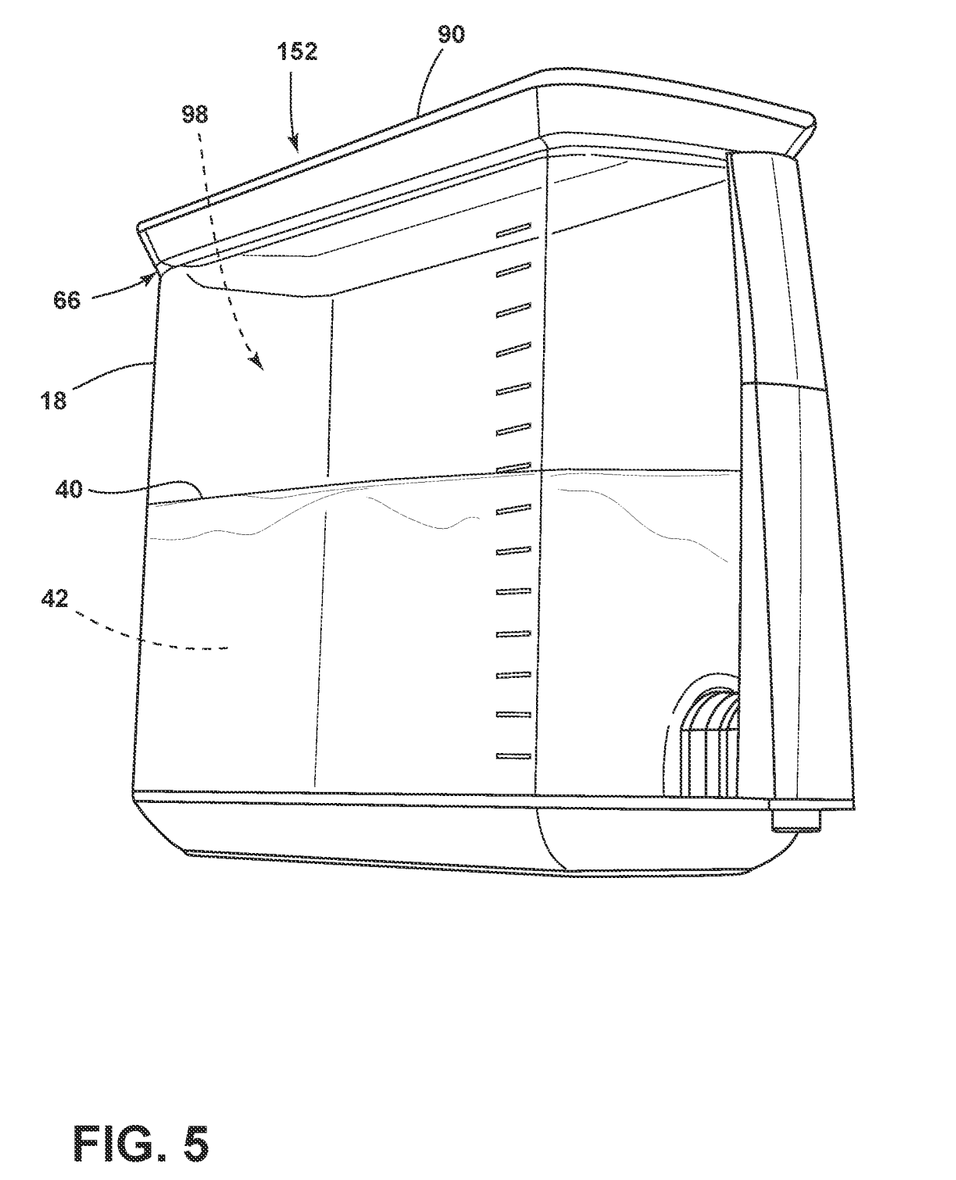
FIG. 5 is a side perspective view of an aspect of the removable fluid container.
Figure 6:
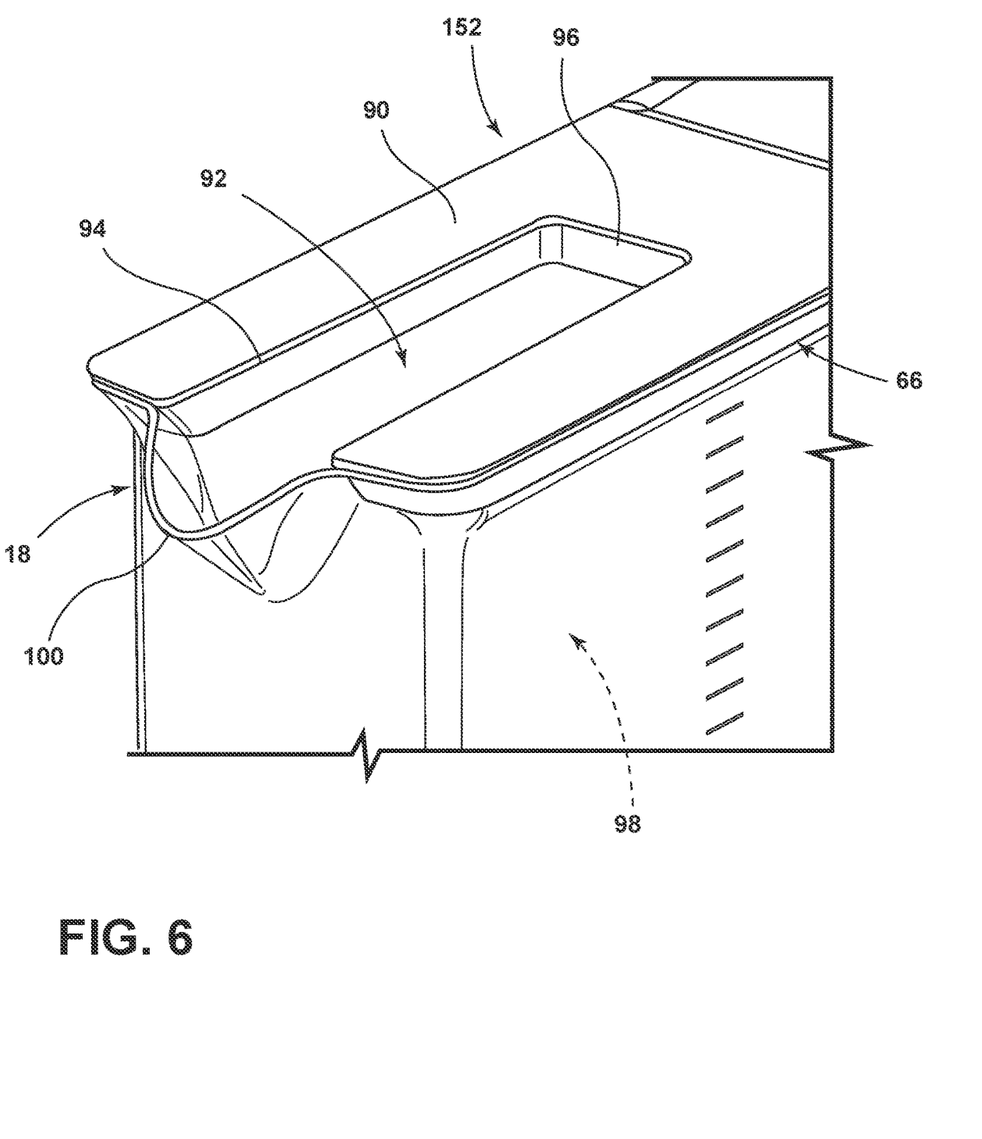
FIG. 6 is a top perspective view of a lid for the removable fluid container of FIG. 5.

Referring now to FIGS. 2-4, the shelf 32 disposed within the appliance 14 can typically include a rail assembly 60 that receives the removable fluid container 18 that operates with the shelf spigot 34 when the removable fluid container 18 is in an installed position 62. The rail assembly 60 can include one or more sliding rails 64 that are adapted to receive grooves 66 that are defined within a portion of the removable fluid container 18. The rail assembly 60 can also include snap-type portions or a threaded mechanism 154 (shown in FIG. 8) that receives a removable fluid container 18 within a dedicated portion 68 of the fill zone 44. The rail assembly 60 is configured to receive at least one removable fluid container 18. It is also contemplated that the rail assembly 60 can receive a plurality of removable fluid containers 18. Where a plurality of removable fluid containers 18 are included, the shelf spigot 34 may include a plurality of fluid ports 70 or outlet ports that selectively and independently dispense a dispensed fluid 42 into a dedicated removable fluid container 18. Using the rail assembly 60, a dedicated removable fluid container 18 or one of a plurality of removable fluid containers 18 can slidably engage the rail assembly 60 to define an installed position 62 that is within the fill zone 44. The installed position 62 or fill position of the various removable fluid containers 18 are typically positioned beneath an outlet fluid port 70 that is part of the shelf spigot 34.

Referring again to FIGS. 2-6, in various aspects of the device, the shelf spigot 34 can include an elongated housing 80 that extends from a portion of the structural cabinet 22. The elongated housing 80 can contain one or more fluid lines 82, where each dedicated fluid line 82 is configured to be delivered to separate fluid ports 70 of the shelf spigot 34. Where a single fluid port 70 is included within the shelf spigot 34, a single dedicated fluid line 82 is adapted to be positioned within the elongated housing 80 of the shelf spigot 34. Where multiple fluid ports 70 are included within the shelf spigot 34, a single fluid line 82 can be adapted to deliver fluid, typically water 16, through the various fluid ports 70 of the shelf spigot 34. In such an embodiment, the fluid line 82 can include one or more valves 136 that can operate to provide a delivered fluid into the fill zone 44 for filling a removable fluid container 18. In various aspects of the device, the elongated housing 80 can include multiple fluid lines 82. In such an embodiment, each fluid line 82 can represent a dedicated fluid line 82 that serves a single fluid port 70 of the shelf spigot 34.

Referring again to FIGS. 2-6, the elongated housing 80 of the shelf spigot 34 is configured to cooperatively engage a lid 90 of the dedicated removable fluid container 18. In such an embodiment, the rail system is configured to support the dedicated removable fluid container 18 and also position an opening 92 within the lid 90 of the removable fluid container 18 within the fill zone 44 underneath a fluid port 70 of the shelf spigot 34. In various aspects of the device, the elongated housing 80 can matingly fit within an aperture 94 defined within the lid 90 for the dedicated removable fluid container 18. This mating engagement between the elongated housing 80 and the lid 90 for the removable fluid container 18 can be adapted to minimize splashing, leakage, and other occurrences where dispensed fluid 42 is disposed outside of the dedicated removable fluid container 18.

As discussed above, the dedicated removable fluid container 18 can include sliding members or grooves 66 that are located proximate the lid 90 for the removable fluid container 18. These grooves 66 can be in the form of contoured portions of side walls for the removable fluid container 18. These contoured portions or grooves 66 are configured to slidably engage the sliding rails 64 of the rail assembly 60 for moving the removable fluid container 18 into the installed position 62 for filling within the fill zone 44. The aperture 94 within the lid 90 that matingly receives the elongated housing 80 can also serve as a stop or bumper 96 for limiting the inward movement of the removable fluid container 18 into the installed position 62. Through this bumper 96, the cooperation of the lid 90 and the elongated housing 80 can serve to properly position the removable fluid container 18 in the fill zone 44.

Additionally, the bottom surface of the elongated housing 80 is contained within the interior volume 98 of the removable fluid container 18 such that the fluid port 70 is entirely contained within the interior volume 98 of the removable fluid container 18. As dispensed water 16 enters into the removable fluid container 18, a pour spout 100 for the removable fluid container 18 can be offset from a surface of the elongated housing 80. Through this offset configuration, a space is provided to allow for equalization of pressure between the interior volume 98 of the removable fluid container 18 and the areas surrounding the removable fluid container 18.

Figure 7:
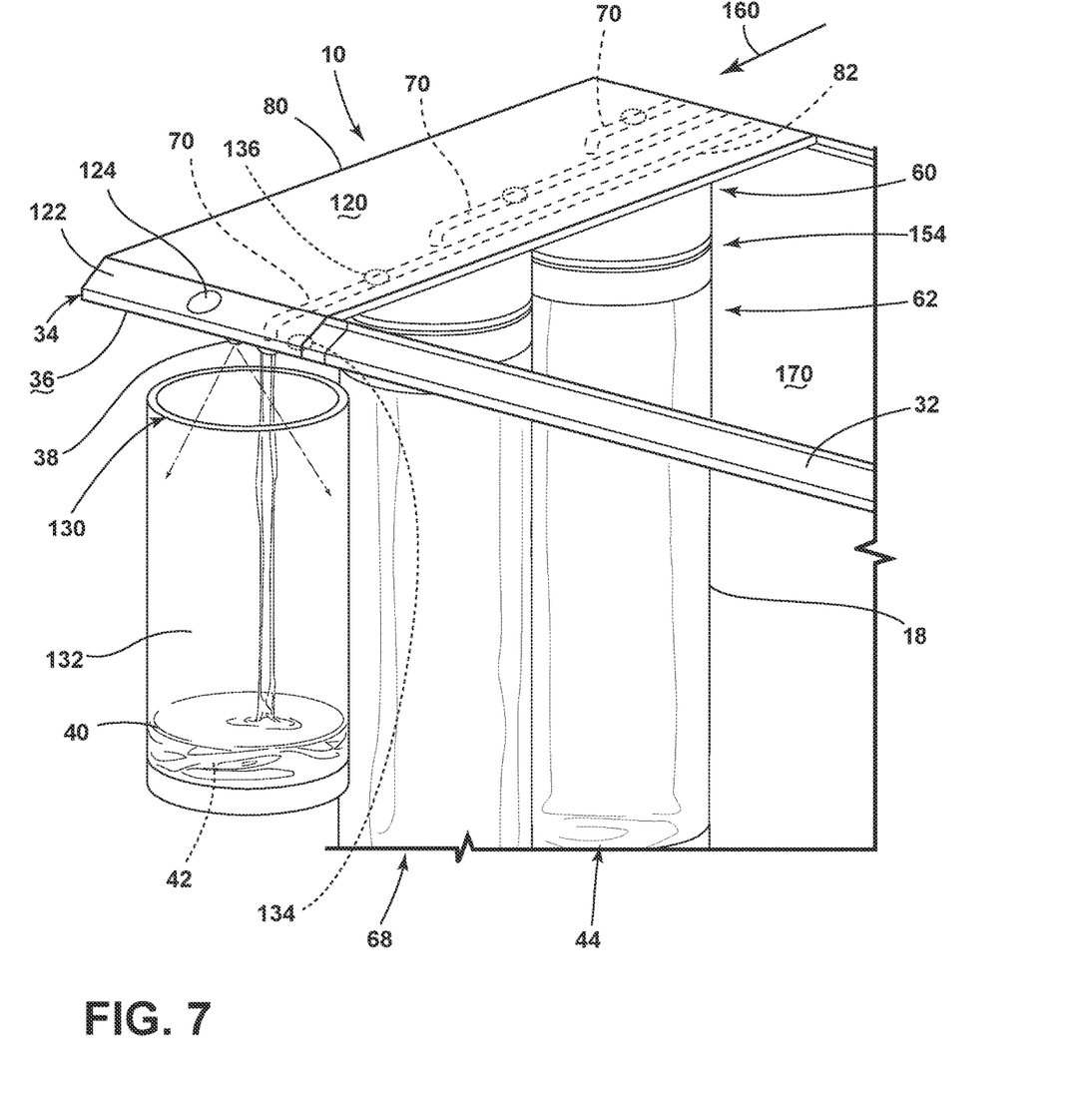
FIG. 7 is a top perspective view of an aspect of the prefilling water solution showing a plurality of fluid containers disposed within dedicated portions of the accessible zone.
Figure 8:
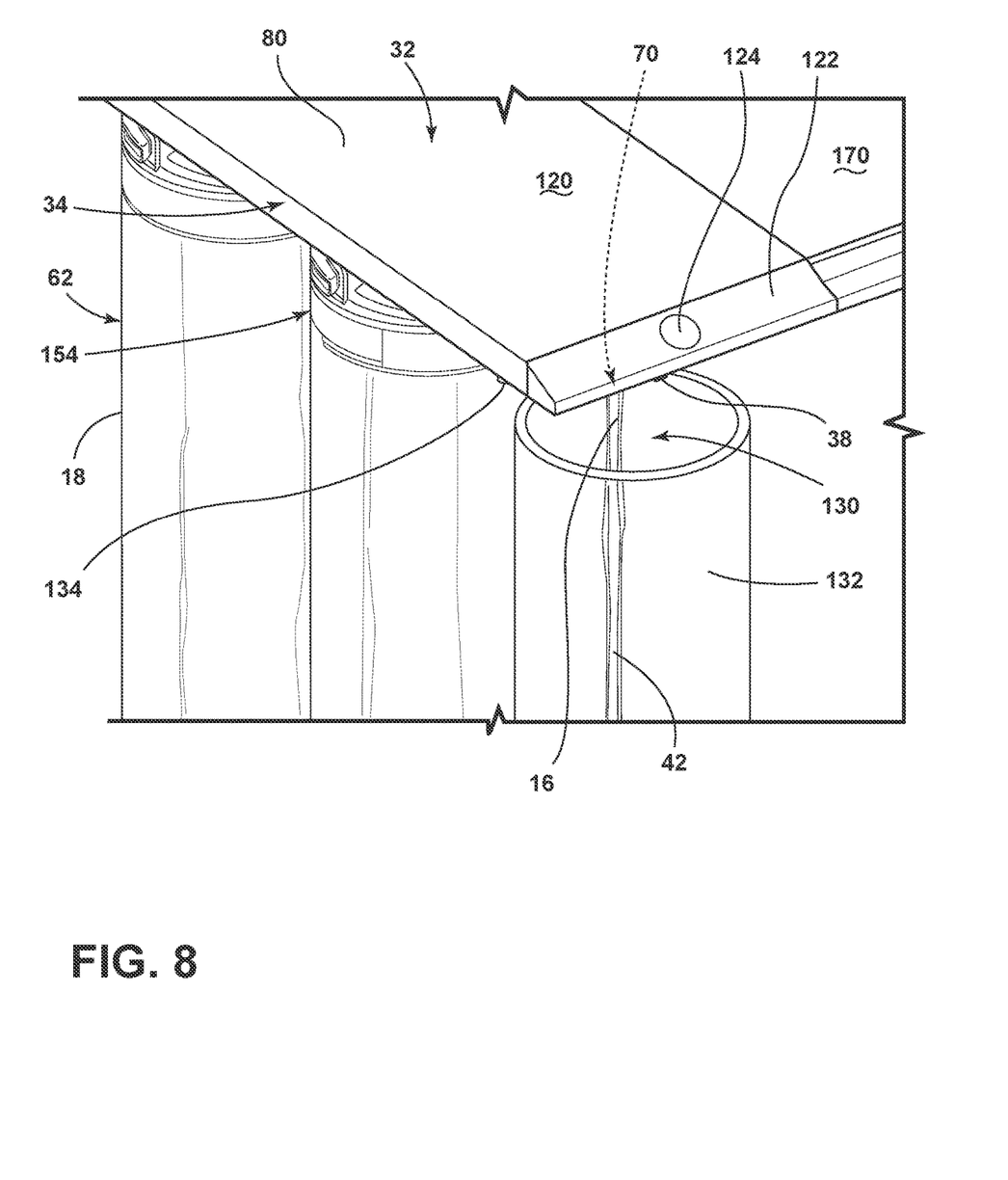
FIG. 8 is another top perspective view of the prefilling water dispenser of FIG. 7.
Figure 9:
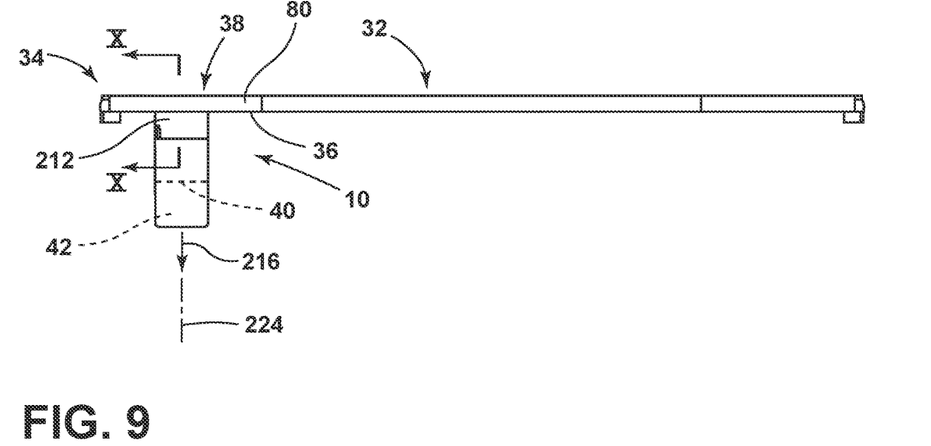
FIG. 9 is a front elevational view of a shelf that incorporates an aspect of the prefilling water solution having a load cell as the fluid level sensor for the removable fluid container.

Referring now to FIGS. 7 and 8, the shelf spigot 34 can include a plurality of fluid ports 70 that cooperatively define a fill zone 44. In such an embodiment, each fluid port 70 defines a dedicated portion 68 of the fill zone 44. Additionally, each fluid port 70 in each of the dedicated portions 68 of the fill zone 44 are configured to respectively receive a removable fluid container 18 of plurality of removable fluid containers 18. In this manner, separate removable fluid containers 18 can be attached with the rail assembly 60 for defining the installed position 62 of each of the removable fluid containers 18. The rail assembly 60 can be configured to slidably engage each of the plurality of removable fluid containers 18. It is also contemplated that each of the plurality of removable fluid containers 18 can be rotatingly engaged with a threaded portion of the elongated housing 80 of the fill spigot or the rail assembly 60 of the shelf 32. It should be understood that various types of engagements between the removable fluid containers 18 and the rail assembly 60 or the elongated housing 80 are possible. Such engagements are adapted to be robust enough to support, from an underside 36 of the shelf 32, the dedicated removable fluid containers 18 and the dispensed fluid 42 contained therein.

Referring again to FIGS. 7 and 8, the elongated housing 80, in certain aspects of the device, can be integrally formed within a portion of the shelf 32. Accordingly, the elongated housing 80 can include a portion of the shelf 32, within which the fluid line 82 or fluid lines 82 are run for delivering water 16 to the shelf spigot 34 that can include the plurality of fluid ports 70. In such an embodiment, the elongated housing 80 can define a top surface 120 of the shelf 32. Accordingly, this top surface 120 of the shelf 32, which includes the elongated housing 80, can provide space upon which various items can be stored within the refrigerating compartment 20.

Referring again to FIGS. 7 and 8, a front portion 122 or nose of the elongated housing 80 can define a user interface 124 for operating the shelf spigot 34 that includes the one or more fluid ports 70. According to various aspects of the device, the shelf spigot 34 can include the plurality of fluid ports 70. These various fluid ports 70 are configured to direct a dispensed fluid 42 in a generally downward direction and into the fill zone 44. As discussed above, dedicated portions 68 of this fill zone 44 can be reserved for dedicated removable fluid containers 18 that can be engaged with the rail assembly 60 for holding the dedicated removable fluid container 18 in the installed position 62 relative to the fluid ports 70.

In various aspects of the device, as exemplified in FIGS. 7 and 8, one of the fluid ports 70 can define a user accessible portion 130 of the fill zone 44. This user accessible portion 130 is configured to selectively receive an external fluid container 132. This external fluid container 132 can be in the form of a glass, pitcher, bowl, flexible member, absorbent material, or other similar material or container that can be used to hold dispensed fluid 42 therein. In such an embodiment, the plurality of removable fluid containers 18 can correspond to the dedicated portions 68 of the fill zone 44 that are distal from the user accessible portion 130. In certain aspects of the device, the user accessible portion 130 may not include usable portions of the rail assembly 60. In such an embodiment, the external fluid container 132 can be moved substantially close to the fluid port 70 that defines the user accessible portion 130. Upon activation of the fluid port 70 within the user accessible portion 130, dispensed fluid 42 can be dispensed into the external fluid container 132. It is contemplated that the user accessible portion 130 can be operated by a fluid level sensor 38, proximity sensor 134, or other similar positioning sensor that can detect the presence of an external fluid container 132 within the user accessible portion 130. Using various sensors, the controller 46 for the water dispensing system 12 can activate a valve 136 to dispense a dispensed fluid 42 into the user accessible portion 130 upon sensing that an external fluid container 132 is properly positioned in the user accessible portion 130. It is also contemplated that the user interface 124 can be used to either manually activate a valve 136 for providing dispensed water 16, or for communicating to a controller 46 to activate the valve 136 for providing dispensed fluid 42 into the user accessible portion 130.

According to various aspects of the device, as exemplified in FIGS. 1-8, one or more fluid level sensors 38 can be incorporated with the shelf spigot 34 for monitoring the amount of dispensed fluid 42 within a dedicated removable fluid container 18 or an external fluid container 132 within a user accessible portion 130 that includes a dedicated user accessible shelf spigot 34 or fluid outlet 30. These various sensors can include, but are not limited to, proximity sensors 134, fluid level sensors 38, pressure sensors, weight scales, floats, lasers, ultrasonic sensors, infrared sensors, cameras, microphones, and various other sensors that can be used to determine an amount of dispensed fluid 42 within a particular removable fluid container 18 or external fluid container 132. The sensors of the shelf spigot 34 can also be incorporated to monitor the presence of a dedicated removable fluid container 18 or an external fluid container 132. Using the fluid level sensors 38 and the container detection sensors, a controller 46 can monitor and evaluate whether a container is appropriately in an installed position 62 within a dedicated portion 68 of the fill zone 44. The controller 46 can also evaluate the amount of dispensed fluid 42 within the dedicated fluid container for operating a valve 136 to stop the flow of dispensed fluid 42 therein. Additionally, the controller 46 can use the fluid level sensor 38 and the container detection sensors for assessing a user accessible portion 130 for monitoring when an external fluid container 132 is positioned in an installed position 62 to receive dispensed water 16 from a fluid port 70. The fluid level sensor 38 can also assess the amount of dispensed fluid 42 contained within the external fluid container 132.

According to various aspects of the device, the rail assembly 60 that cooperates with the elongated housing 80 and the shelf spigot 34 is configured to define the installed position 62 of the dedicated removable fluid container 18. In this embodiment, the installed position 62 of the dedicated removable fluid container 18 can be defined by the removable fluid container 18 being engaged with the rail assembly 60 and also suspended from the rail assembly 60 so that the removable fluid container 18 is suspended above a vertically adjacent shelf 150. By suspending the removable fluid container 18 above the vertically adjacent shelf 150, movement of the removable fluid container 18 from the installed position 62 to a removed position 152, separate from the rail assembly 60, can be a convenient sliding motion that involves only movement of the removable fluid container 18 with respect to the rail assembly 60. Additionally, by suspending the removable fluid container 18 above the vertically adjacent shelf 150, a threaded mechanism 154 can be used for placing a dedicated removable fluid container 18 within the installed position 62. The space above the vertically adjacent shelf 150 provides for a vertical movement that coincides with operation of the threaded mechanism 154 of the dedicated removable fluid container 18 with respect to the elongated housing 80 of the shelf spigot 34.

Referring again to FIGS. 1-8, the refrigerating appliance 14 can include the structural cabinet 22 having the inner liner 24 that defines the refrigerating compartment 20. The water dispensing system 12 is coupled to the structural cabinet 22 and includes at least one fluid outlet 30. The shelf 32 is coupled with the inner liner 24 and is positioned within the refrigerating compartment 20. The shelf 32 includes a plurality of shelf spigots 34 that make up the at least one fluid port 70. The plurality of shelf spigots 34 are positioned below an underside 36 of the shelf 32. A plurality of removable fluid containers 18 can be placed in communication with the plurality of shelf spigots 34, respectively. The plurality of shelf spigots 34 can be positioned below an underside 36 of the shelf 32. Fluid level sensors 38 are positioned proximate the shelf 32 and can be positioned below the shelf 32 and are in communication with the respective removable fluid containers 18 of the plurality of removable fluid containers 18. The fluid level sensors 38 are also in communication with the water dispensing system 12, and in particular, a controller 46 for the water dispensing system 12. The rail assembly 60 for the plurality of shelf spigots 34 selectively receives and supports a plurality of removable fluid containers 18 within the fill zone 44 that corresponds to dedicated shelf spigots 34 of the plurality of shelf spigots 34. As discussed above, the plurality of shelf spigots 34 may be referred to as fluid ports 70. One of these fluid ports 70 can include the user-accessible fluid port 70 that is distal from the rail assembly 60. The user-accessible fluid port 70 is configured to define the user accessible portion 130.

Referring again to FIGS. 1-8, each shelf spigot 34 is configured to be in communication with a dedicated fluid line 82 and a dedicated fluid level sensor 38 of the various fluid level sensors 38. As discussed above, each shelf spigot 34 can include a plurality of fluid ports 70 that dispense a dispensed fluid 42 into the fill zone 44. The plurality of removable fluid containers 18 are configured to engage the rail assembly 60 to define the installed position 62 within a dedicated portion 68 of the fill zone 44. The installed position 62 of each removable fluid container 18 of the plurality of removable fluid containers 18 is defined by the removable fluid container 18 engaging the rail assembly 60 and being suspended above the vertically adjacent shelf 150. Typically, the shelf spigots 34 can be attached to the underside 36 of the shelf 32. It is also contemplated that the shelf spigots 34 can be incorporated within an elongated housing 80 that forms a portion of the shelf 32.

As exemplified in FIGS. 2-8, a fluid delivery system for the appliance 14 includes a fluid line 82 that is in selective communication with a fluid source 160. This fluid source 160 can take the form of a larger storage tank within the appliance 14. The fluid source 160 can also take the form of an external fluid source 160 such as a tap that is connected to a water pump or municipal water supply. The shelf 32 defines the fill zone 44 that is positioned below an underside 36 of the shelf 32. The shelf spigot 34 is coupled with the fluid line 82 and is disposed proximate the underside 36 of the shelf 32 and over the fill zone 44. As discussed above, the shelf spigot 34 can be incorporated within an elongated housing 80 that defines a portion of the shelf 32. In such an embodiment, the elongated housing 80 can include a top surface 120 that is coplanar with the remainder of the upper surface 170 for the shelf 32. The fluid level sensor 38 is positioned in communication with the fill zone 44. The fluid level sensor 38 is also in communication with the controller 46 that regulates a flow of the dispensed fluid 42 through the various fluid ports 70 of the shelf spigot 34.

According to various aspects of the device, the fluid delivery system described herein can be incorporated within various appliances 14. These appliances 14 can include, but are not limited to, refrigerators, freezers, coolers, water coolers, and other similar appliances that are configured to dispense fluid into a separate container.

According to various aspects of the device, the rail assembly 60 that is positioned proximate the elongated housing 80 can be used to laterally position the removable fluid container 18 within the fill zone 44. In such an embodiment, the removable fluid container 18 may rest upon the vertically adjacent shelf 150. The rail assembly 60 cooperates with the removable fluid container 18 to laterally position the removable fluid container 18 within the fill zone 44. Accordingly, in this embodiment, the rail assembly 60 may not support, vertically, the fluid container.

Referring now to aspects of the device, as exemplified in FIGS. 9-12, the prefilling water dispenser 10 can include a fluid level sensor 38 that incorporates a load cell 210 for monitoring a fluid level 40 of the dispensed fluid 42 that is contained within the removable fluid container 18. The load cell 210 can be incorporated within a head assembly 212 that receives the removable fluid container 18. The various fluid lines 82 can extend into the head assembly 212 for delivering the water 16 through the dedicated fluid port 70 of the shelf spigot 34 into the removable fluid container 18. The removable fluid container 18 hangs from the head assembly 212. The head assembly 212 includes a gravity portion 214 that engages the load cell 210 that is coupled to the shelf 32. In this manner, the removable fluid container 18 exerts a downward force 216 upon the head assembly 212, which moves vertically with respect to the shelf 32 and load cell 210. This downward force 216 is transferred via the gravity portion 214 and into the load cell 210. As the amount of dispensed fluid 42 increases within the removable fluid container 18, the amount of downward force 216 exerted upon the head assembly 212 also increases. This increase in weight of the dispensed fluid 42 within the removable fluid container 18 is transferred into the load cell 210. The load cell 210 monitors this downward force 216. When the removable fluid container 18 is filled, the load cell 210 is adapted to automatically shut off the valve 136 to prevent an overflow of dispensed fluid 42 within the removable fluid container 18.

Figure 10:
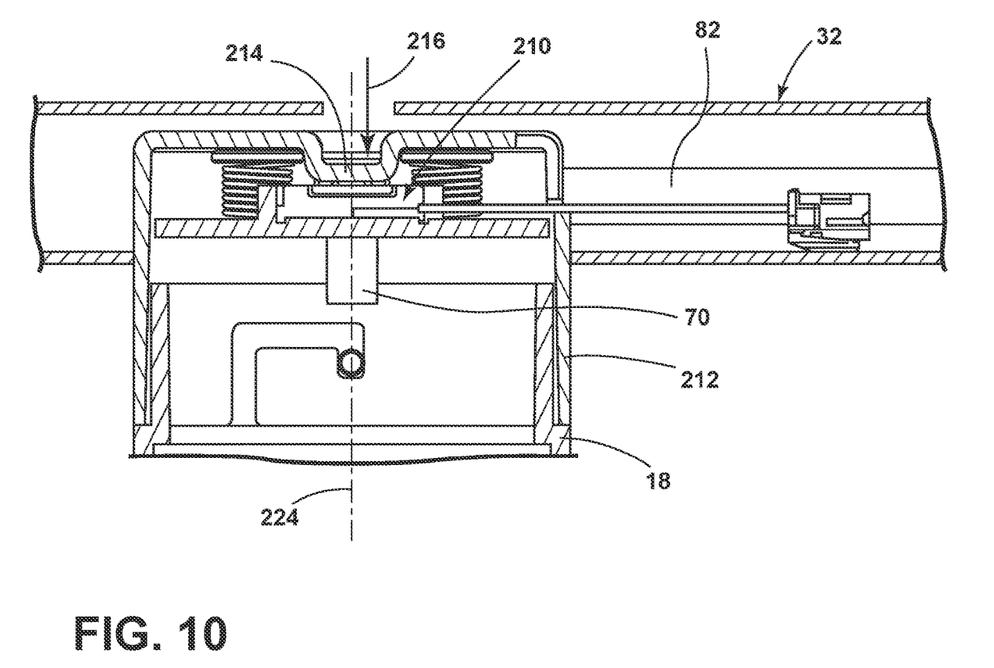
FIG. 10 is a cross-sectional view of the shelf of FIG. 9 taken along line X-X.

As exemplified in FIG. 10, the load cell 210 can be positioned centrally within the head assembly 212. In such an embodiment, the gravity portion 214 places a downward force 216 that compresses a portion of the load cell 210.

According to various aspects of the device, the removable fluid container 18 can be a portable drinking bottle that can be removed from the head assembly 212 for portable use by a user. The rotating assembly that is positioned at the top of the removable fluid 18 can be used in connection with the head assembly 212. When removed from the head assembly 212, a separate portable adapter can be attached to the top of the removable fluid container 18 for use as a portable drinking bottle. This portable drinking bottle can be stored within the refrigerating appliance to cool the water 16 contained therein. When the water bottle is empty or near empty, the removable water bottle 18 can be connected with a head assembly 212 to be automatically filled with water 16. Using the load cell 210, the water dispenser 10 can determine an amount of water 16 contained within the removable fluid container 18 at any time. The load cell 210 can also operate to measure when the removable fluid container 18 is filled with water 16 to prevent overflow by shutting off the valve 136. Accordingly, the load cell 210 can be attached with a controller 46 for operating the water dispenser 10.

Figure 11:
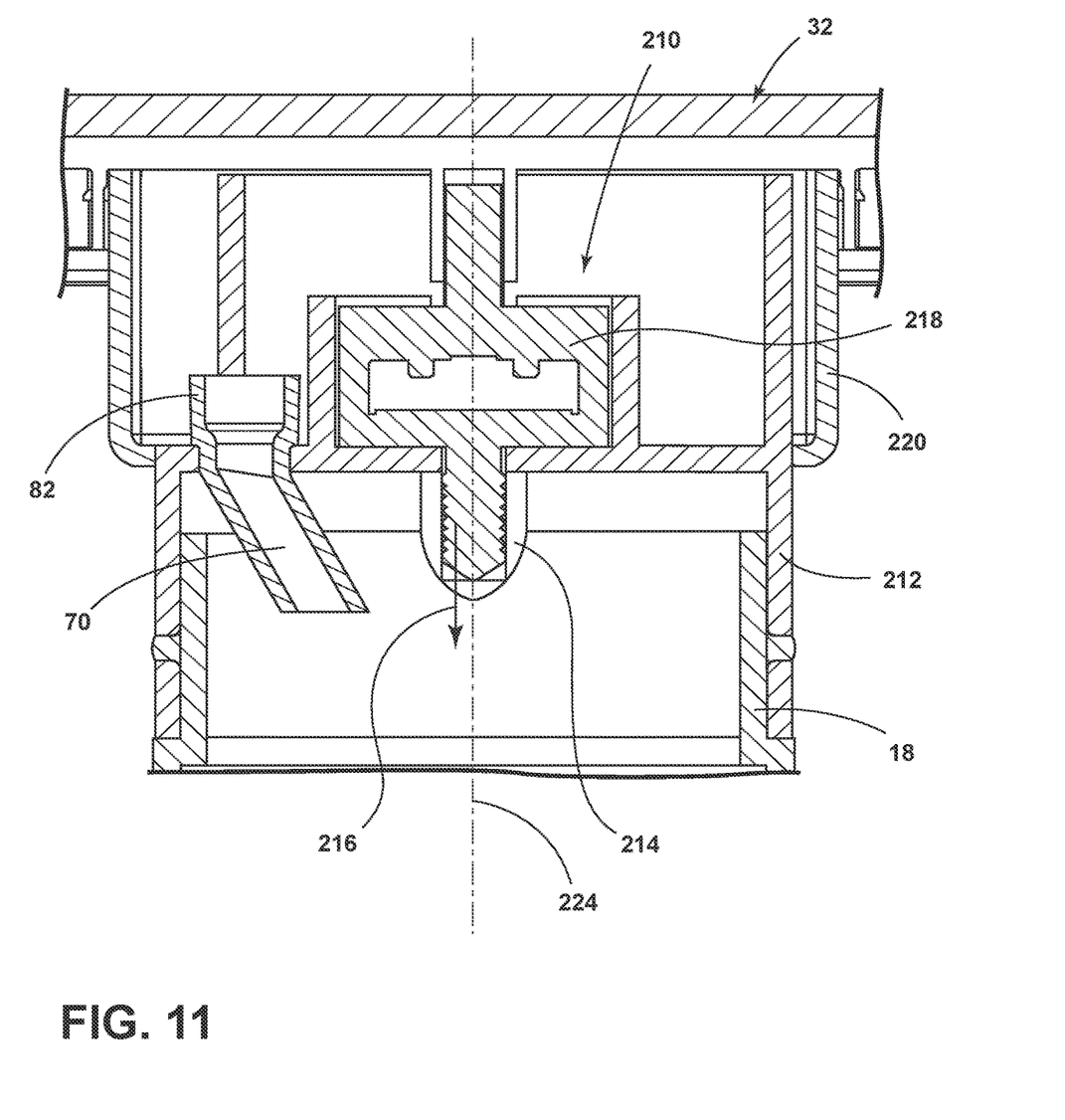
FIG. 11 is an alternative cross-sectional view of the shelf of FIG. 9 and showing a tension-type load cell for monitoring an amount of fluid within the removable fluid container.

Referring now to FIG. 11, the load cell 210 can be in the form of a tension cell 218. The tension cell 218 operates in connection with the head assembly 212. Using the tension cell 218, the downward force 216 exerted by the removable fluid container 18 having the water 16 is a pulling force rather than a downward compressive force. In this manner, the tension cell 218 measures an amount of tension represented by the downward force 216 exerted by the removable fluid container 18 having water 16 contained therein. The head assembly 212 is attached to the tension cell 18 and pulls a portion of the tension cell 218 downward to measure the downward force 216. To conceal various components of the load cell 210, a cosmetic cover 220 can be positioned around the head assembly 212 for concealing the load cell 210, the tension cell 218, or other similar aspect of the load cell 210.

According to various aspects of the device, the load cell 210 can be incorporated within an aspect of the rail assembly 60. In such an embodiment, the load cell 210 can be coupled with one or both of the sliding rails 64. Where the removable fluid container 18 is a pitcher that engages the sliding rails 64, the sliding rails 64 can transfer the downward force 216 that is exerted by the removable fluid container 18 having the water 16 into the load cell 210. As with the previous aspects of the device, the load cell 210 can be incorporated within a portion of the shelf 32.

Figure 12:
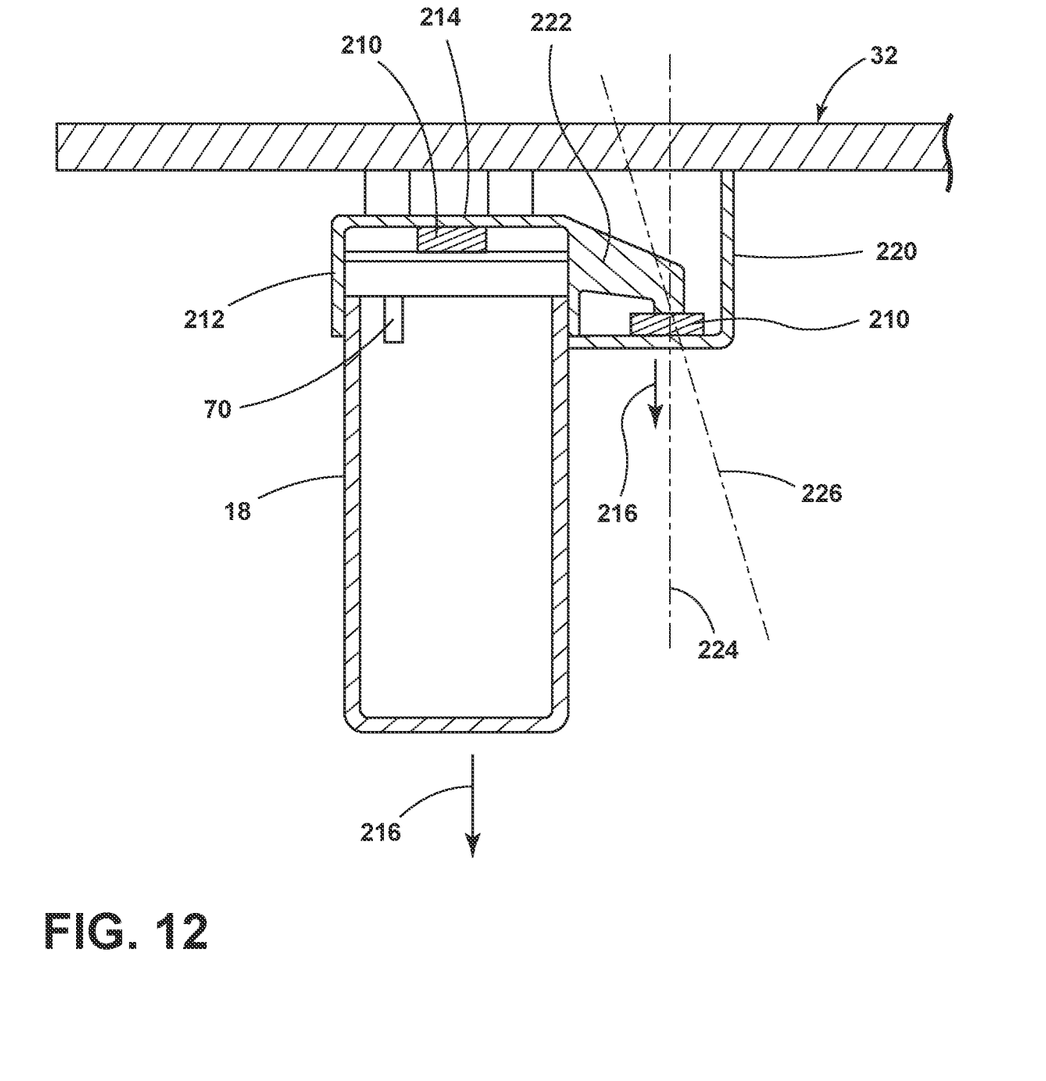
FIG. 12 is an alternative cross-sectional view of the shelf of FIG. 9 and showing the prefill water solution incorporating a load cell for use in connection with a removable fluid container.

Referring now to FIG. 12, the load cell 210 can be positioned eccentric to the head assembly 212 and the removable water bottle 18. In such an embodiment, the head assembly 212 can include a moment arm 222 that exerts the downward force 216 onto the load cell 210. Using the moment arm 222, the downward force 216 is exerted along a vertical axis 224 that may be outside of the removable fluid container 18. Using the moment arm 222, the downward force 216 engages the load cell 210 along this vertical axis 224. Where there is improper installation between the removable fluid container 18 and the head assembly 212, a torque is typically exerted upon the head assembly 212. This torque results in the downward force 216 being exerted onto the load cell 210 in an angular direction 226. When the downward force 216 is exerted in this angular direction 226, an improper load is placed upon the load cell 210. This improper loading is communicated by the load cell 210 and to the user to provide an error message concerning the installation of the removable fluid container 18 within the head assembly 212. When the removable fluid container 18 is properly installed within the head assembly 212, the downward force 216 is exerted by the moment arm 222 along the vertical axis 224 and into the load cell 210. In this embodiment, the moment arm 222 is an outward extension of the head assembly 212.

In various aspects of the device, the downward force 216 exerted by the removable fluid container 18 onto the head assembly 212 is substantially similar to that exemplified in FIG. 10. Additionally, it is contemplated that the embodiment illustrated in FIG. 12 can include a pair of load cells 210. One load cell 210 can be used to measure an amount of water 16 contained within the removable fluid container. The other load cell 210 can be used to determine whether the removable fluid container 18 has been properly installed within the head assembly 212. Alternatively, it is contemplated that a single load cell 210 can be positioned eccentric to the head assembly 212 for engaging the moment arm 222 that extends outward from the head assembly 212.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A shelving assembly for an appliance, the shelving assembly comprising:
   a shelf that is configured to be disposed within an appliance cabinet, wherein the shelf includes a top surface for storing items thereon;
   a fluid dispensing system coupled to the shelf and configured to be attached to a fluid delivery system of the appliance cabinet, the fluid dispensing system having a fluid outlet;
   a shelf spigot of the fluid dispensing system, the shelf spigot disposed on an underside of the shelf, the shelf spigot configured to deliver fluid from the fluid delivery system, through the fluid dispensing system, and to a fill zone positioned below an underside of the shelf;
   a rail assembly disposed on the underside of the shelf for securing a fluid container to the underside of the shelf and within the fill zone, wherein the rail assembly selectively supports the fluid container from above; and
   a load cell coupled with one of the shelf and the rail assembly, wherein the load cell senses a weight of the fluid container and contents of the fluid container, and wherein the load cell is in communication with the fluid dispensing system wherein the shelf spigot extends through a portion of the rail assembly.

2. The shelving assembly of claim 1, wherein the shelf spigot extends through a portion of the load cell.

3. The shelving assembly of claim 1, wherein the shelf spigot includes an elongated housing that cooperatively engages a lid of the fluid container, wherein the rail assembly is configured to support the fluid container and position an opening of the fluid container in the fill zone.

4. The shelving assembly of claim 1, wherein the shelf spigot includes a plurality of fluid ports, wherein each fluid port defines dedicated portions of the fill zone, and wherein each fluid port and each of the dedicated portions of the fill zone are configured to respectively receive any one fluid container of a plurality of fluid containers.

5. The shelving assembly of claim 4, wherein each fluid port includes a dedicated load cell.

6. The shelving assembly of claim 4, wherein a user-accessible fluid port of the plurality of fluid ports defines a user accessible portion of the fill zone, wherein the user accessible portion is configured to selectively receive an external fluid container, and wherein the plurality of fluid containers correspond to the dedicated portions of the fill zone distal from the user accessible portion.

7. The shelving assembly of claim 1, wherein the shelf is configured to be coupled with an inner liner of the appliance cabinet and the fluid dispensing system is configured to be coupled with the fluid delivery system at the inner liner.

8. The shelving assembly of claim 1, wherein the load cell includes a plurality of sensors spaced throughout the rail assembly, wherein the weight of the fluid container and the contents of the fluid container are configured to be distributed evenly among the plurality of sensors to determine whether the fluid container is properly installed.

9. A shelf assembly for a refrigerating appliance, the shelf assembly comprising:
a shelf that is configured to be coupled with an inner liner of a structural cabinet, wherein the shelf includes a plurality of shelf spigots, the plurality of shelf spigots being positioned below an underside of the shelf, and wherein the plurality of shelf spigots are configured to be attached to a fluid dispensing system of the structural cabinet;
a rail assembly disposed on the underside of the shelf;
a plurality of weight-sensing load cells that are attached to the rail assembly; and
a plurality of removable fluid containers that are in communication with the plurality of shelf spigots, the plurality of shelf spigots being positioned below the underside of the shelf, wherein the plurality of removable fluid containers are selectively secured to the rail assembly to be supported from above and positioned below the plurality of shelf spigots, wherein the plurality of weight-sensing load cells senses a weight of the plurality of removable fluid containers, respectively, and wherein the plurality of weight-sensing load cells is in communication with the plurality of shelf spigots, wherein each shelf spigot of the plurality of shelf spigots is in communication with a dedicated fluid line and a dedicated weight-sensing load cell of the plurality of weight-sensing load cells, wherein
the rail assembly selectively receives and supports the plurality of removable fluid containers within a fill zone that corresponds to dedicated shelf spigots of the plurality of shelf spigots;
the plurality of weight-sensing load cells extend between the rail assembly and a stationary portion of the shelf, wherein the plurality of weight-sensing load cells and the rail assembly deflect with respect to the shelf.

10. The shelf assembly of claim 9, wherein the plurality of shelf spigots includes a user-accessible fluid port that is distal from the rail assembly, wherein the user-accessible fluid port defines a user accessible portion of the fill zone.

11. The shelf assembly of claim 9, wherein the plurality of removable fluid containers engage the rail assembly to define an installed position within a dedicated portion of the fill zone.

12. The shelf assembly of claim 11, wherein the installed position of each removable fluid container of the plurality of removable fluid containers is defined by the removable fluid container engaged with the rail assembly and suspended above a vertically adjacent shelf.

13. The shelf assembly of claim 9, wherein the plurality of shelf spigots are attached to the underside of the shelf.

14. The shelf assembly of claim 9, wherein the shelf is configured to be coupled with the inner liner of the structural cabinet and the fluid dispensing system is configured to be coupled with the fluid dispensing system at the inner liner.

15. The shelf assembly of claim 9, wherein the plurality of removable fluid containers includes a pitcher that selectively engages the rail assembly in the fill zone.

16. A shelf assembly for an appliance, the shelf assembly comprising:
a shelf configured to be attached to a structural cabinet and having a top surface for storing items and defining a fill zone positioned below an underside of the shelf, wherein the top surface and the fill zone are configured to be located within a single continuous storage compartment;
a retaining load cell positioned on the underside of the shelf for supporting a removable container from above and for sensing a weight of the removable container and contents of the removable container; and
a shelf spigot coupled with a fluid line that is configured to be coupled with a fluid source, the shelf spigot disposed proximate the underside of the shelf and over the fill zone, wherein the retaining load cell regulates a flow of fluid through the shelf spigot.

17. The shelf assembly of claim 16, further comprising:
a rail assembly that is coupled with the retaining load cell, wherein the rail assembly selectively positions a dedicated fluid container in the fill zone.

18. The shelf assembly of claim 17, wherein the dedicated fluid container is entirely supported by the rail assembly and the retaining load cell.

19. The shelf assembly of claim 16, wherein the retaining load cell includes a plurality of sensors spaced within the retaining load cell, wherein the weight of the removable container and the contents of the removable container are configured to be distributed evenly among the plurality of sensors to determine whether the removable container is properly installed.

20. The shelf assembly of claim 16, wherein the shelf is configured to be coupled with an inner liner of the structural cabinet and the shelf spigot is configured to be coupled with the fluid source at the inner liner.

* * * * *